(12) United States Patent
Imao et al.

(10) Patent No.: US 6,604,415 B2
(45) Date of Patent: Aug. 12, 2003

(54) TIRE CONDITION MONITORING APPARATUS AND METHOD

(75) Inventors: Noboru Imao, Ogaki (JP); Michiya Katou, Ogaki (JP); Yasuhisa Tsujita, Ogaki (JP)

(73) Assignee: Pacific Industrial Co., Ltd. (JP)

( * ) Notice: Subject to any disclaimer, the term of this patent is extended or adjusted under 35 U.S.C. 154(b) by 0 days.

(21) Appl. No.: 09/956,726

(22) Filed: Sep. 20, 2001

(65) Prior Publication Data
US 2002/0078740 A1 Jun. 27, 2002

(30) Foreign Application Priority Data

Dec. 27, 2000 (JP) .......................... 2000-397356
Mar. 28, 2001 (JP) .......................... 2001-093529

(51) Int. Cl.$^7$ ............................................. B60C 23/02
(52) U.S. Cl. ..................... 73/146.5; 73/146; 340/442; 340/444
(58) Field of Search ................. 73/146, 146.2, 73/146.5, 146.3, 146.8; 340/442, 443, 444

(56) References Cited

U.S. PATENT DOCUMENTS 4,609,905 A * 9/1986 Uzzo ............................ 73/146
6,034,597 A    3/2000 Normann et al. ............ 340/447
6,112,585 A    9/2000 Schrottle et al.
6,278,363 B1 * 8/2001 Bezek et al. ................. 73/146
6,292,096 B1 * 9/2001 Munch et al. .............. 73/146.2

FOREIGN PATENT DOCUMENTS

JP      10-104103       4/1998

* cited by examiner

Primary Examiner—Hezron Williams
Assistant Examiner—Alandra Ellington
(74) Attorney, Agent, or Firm—Cook, Alex, McFarron, Manzo, Cummings & Mehler, Ltd.

(57) ABSTRACT

In detecting which transmitter of several of transmitters has transmitted a radio signal based on digital data from an RF circuit, a main controller of a receiver consecutively sends activation commands to each of several control circuits such that only one of the control circuits is activated at a time. The main controller detects which of the antennas corresponds to the control circuit that was activated when the voltage level signal from the RF circuit was lowest, and judges that the detected antenna is closest to the transmitter that transmitted the radio wave. As a result, the power consumption is reduced, and the transmitter that transmitted the radio wave is accurately detected.

14 Claims, 3 Drawing Sheets

TIRE CONDITION MONITORING APPARATUS AND METHOD

BACKGROUND OF THE INVENTION

The present invention relates to an apparatus and a method for monitoring the conditions of automobile tires. More particularly, the present invention pertains to a system for receiving data transmitted from transmitters, each of which is located in one of the tires of a vehicle.

Wireless tire condition monitoring apparatuses for allowing a driver in a vehicle passenger compartment to check the condition of vehicle tires are known. One such monitoring system includes transmitters and a receiver. Each transmitter is located in one of the wheels and the receiver is located in the body frame of the vehicle. Each transmitter detects conditions such as the air pressure and the temperature of the associated tire and wirelessly transmits the detected information. The receiver receives the information from the transmitters.

Each transmitter is located in one of the tires of a vehicle. The receiver has reception antennas, each of which corresponds to one of the transmitters. Each reception antenna induces a voltage signal that corresponds to the field intensity of radio waves from the associated transmitter. The receiver processes each voltage signal to obtain data.

When receiving data, the receiver must identify the tire in which the transmitter that has transmitted data is located. The tire condition monitoring apparatus disclosed in Japanese Unexamined Patent Publication No. 10-104103 includes a receiver that has such a function. The receiver of the publication switches multiple antennas by a multiplexer circuit such that the voltage induced by a particular one of the reception antennas is valid at a given time. The receiver then determines the reception antenna that has the highest induced voltage level. Since the reception antenna that has the highest induced voltage level is closest to the transmitter that has transmitted the data, the receiver can identify the transmitter.

However, the receiver of the publication must keep the multiplexer circuit activated while waiting for signals from all the transmitters so that the receiver can receive voltage signals from all the antennas, which increases the electricity consumption.

Since the induced voltage of only one of the reception antennas is valid at a given time when identifying the transmitter that has transmitted data, the level of the induced voltage is relatively low. Therefore, accurate identification of a transmitter is difficult.

BRIEF SUMMARY OF THE INVENTION

Accordingly, it is an objective of the present invention to provide a tire condition monitoring apparatus and method that reduce power consumption and accurately identifies the transmitter that has transmitted data.

To achieve the foregoing and other objectives and in accordance with the purpose of the present invention, a tire condition monitoring apparatus for monitoring the conditions of a plurality of tires of a vehicle is provided. The apparatus includes a plurality of transmitters, a plurality of reception antennas, a plurality of level control circuits, a coupler and a controller. Each transmitter is located in one of the tires and transmits data that represents the condition of the corresponding tire by radio waves. The reception antennas are located in the body of the vehicle. Each reception antenna corresponds to one of the transmitters and induces a voltage signal upon receiving radio waves from each transmitter. Each level control circuit corresponds to one of the reception antennas and lowers the level of an associated voltage signal that is induced by the corresponding reception antenna. The coupler synthesizes voltage signals from the level control circuits to form a synthesized voltage signal. The controller controls the level control circuits. When one of the transmitters has transmitted radio waves, the controller commands all the level control circuits to consecutively execute level lowering procedure at intervals such that only one of the level control circuits lowers the level of the associated voltage signal at a time. The controller identifies the level control circuit that lowered the level of the associated voltage signal when the level of the synthesized voltage signal was lowest. The controller determines that the reception antenna that corresponds to the identified level control circuit corresponds to the transmitter that has transmitted radio waves.

The present invention provides another tire condition monitoring apparatus for monitoring the conditions of a plurality of tires of a vehicle. The apparatus includes a plurality of transmitters, a plurality of reception antennas, a plurality of amplifiers, a coupler and a controller. Each transmitter is located in one of the tires and transmits data that represents the condition of the corresponding tire by radio waves. The reception antennas are located in the body of the vehicle. Each reception antenna corresponds to one of the transmitters and induces a voltage signal upon receiving radio waves from each transmitter. Each amplifier corresponds to one of the reception antennas and amplifies an associated voltage signal that is induced by the corresponding reception antenna. The coupler synthesizes voltage signals from the amplifiers to form a synthesized voltage signal. The controller controls the amplifiers. When one of the transmitters has transmitted radio waves, the controller commands all the amplifiers to consecutively stop amplifying at intervals such that only one of the amplifiers stops amplifying at a time. The controller identifies the amplifier that stopped amplifying when the level of the synthesized voltage signal was lowest. The controller determines that the reception antenna that corresponds to the identified amplifier corresponds to the transmitter that has transmitted radio waves.

Further, the present invention provides a method for monitoring the conditions of a plurality of tires of a vehicle. The method includes transmitting data representing the condition of each tire by radio waves from transmitters, each of which is located in one of the tires, inducing a voltage signal upon receiving radio waves from each transmitter in a plurality of reception antennas, each of which corresponds to one of the transmitters, forming a synthesized voltage signal by synthesizing the voltage signals from the reception antennas, consecutively lowering the levels of the voltage signals induced by all the reception antennas such that only one of the voltage signals is lowered at a time when one of the transmitter transmits a radio wave, and determining that an active one of the transmitters is one that is associated with one of the antennas that corresponds to the voltage signal being lowered when the lowest level of the synthesized voltage signal occurs while the voltage signals are being lowered.

Other aspects and advantages of the invention will become apparent from the following description, taken in conjunction with the accompanying drawings, illustrating by way of example the principles of the invention.

BRIEF DESCRIPTION OF THE SEVERAL VIEWS OF THE DRAWING

The invention, together with objects and advantages thereof, may best be understood by reference to the following description of the presently preferred embodiments together with the accompanying drawings in which.

DETAILED DESCRIPTION OF THE PREFERRED EMBODIMENTS

A tire condition monitoring apparatus according to a first embodiment of the present invention will now be described with reference to FIGS. 1 to 4. As shown in FIG. 2, the tire condition monitoring apparatus includes four tires of a vehicle, first, second, third and fourth transmitters 1, 2, 3 and 4 and a receiver 9. The receiver 9 is mounted on the body frame of the vehicle. Each transmitter 1–4 is secured to the wheel of the associated tire such that the transmitter 1–4 is located within the associated tire. Each transmitter 1–4 detects the air pressure and the internal temperature of the associated tire and transmits radio waves that represent the detected information.

Each transmitter 1–4 basically transmits data at predetermined transmission intervals. The transmission timing of the transmitters 1–4 is adjusted such that the transmitters 1–4 transmit at different times. That is, it is unlikely that two or more of the first to fourth transmitters 1–4 transmit at the same time. Also, when there is an abnormality of the air pressure of the temperature in the corresponding tire, each transmitter 1–4 transmits data regardless of the transmission interval.

First, second, third and fourth reception antennas 5, 6, 7 and 8 are attached to the vehicle body. The reception antennas 5–8 correspond the first to fourth transmitters 1–4, respectively, and are connected to the receiver 9. Radio waves transmitted from each transmitter 1–4 are received by all the antennas 5–8. Each reception antenna 5–8 induces a voltage that corresponds to the field intensity of the received radio waves and sends the induced voltage signal to the receiver 9. The levels of the voltage induced by the reception antennas 5–8 vary in accordance with the position of the transmitter 1–4 that transmitted the radio wave.

Figure 1:
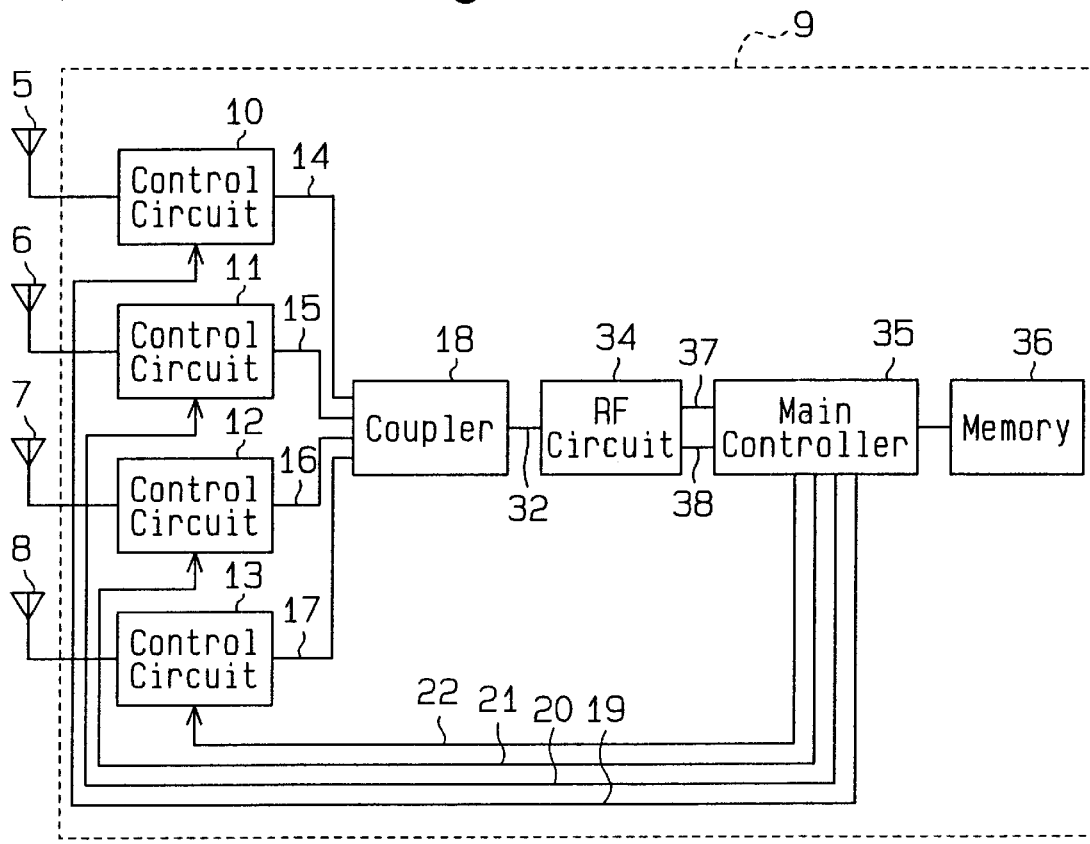
FIG. 1 is a block diagram illustrating a receiver according to a first embodiment of the present invention.
Figure 2:
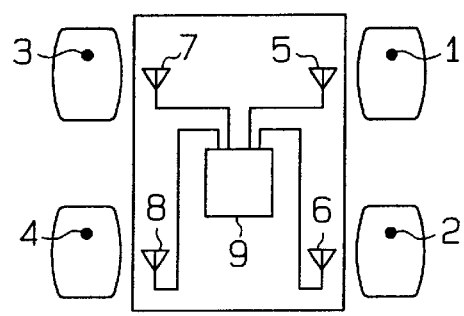
FIG. 2 is a diagrammatic view illustrating a tire condition monitoring apparatus that includes the receiver of FIG. 1.

As shown in FIG. 1, the receiver 9 has first, second, third and fourth control circuits 10, 11, 12 and 13. The first to fourth control circuits 10–13 are connected to the first to fourth reception antennas 5–8, respectively. The receiver 9 also includes a coupler 18, an RF circuit 34, a main controller 35 and a memory 36.

The first to fourth control circuits 10–13 are connected to the coupler 18 through signal lines 14, 15, 16 and 17, respectively. The coupler 18 is connected to the RF circuit 34 through a signal line 32. The RF circuit 34 is connected to the main controller 35 through an analog signal line 37 and a digital signal line 38. The main controller 35, which is a microcomputer, independently controls the first to fourth control circuits 10–13 through control signal lines 19, 20, 21 and 22, respectively.

The control circuits 10–13 receive voltage signals from the corresponding reception antennas 5–8 and send the signals to the coupler 18. Each control circuit 10–13 includes an attenuation circuit for attenuating voltage signals from the corresponding reception antenna 5–8. The attenuation circuit of each control circuit 10–13 is, for example, a jamming circuit, which generates a signal for jamming received voltage signals or an attenuator for attenuating received voltage signals. A jamming circuit cancels a received voltage signal with a jamming signal. Each control circuit 10–13 attenuates received voltage signals according to an activation command from the main controller 35.

The coupler 18, or synthesizer, synthesizes all the voltage signals that are received at the same time and sends the synthesized voltage signal to the RF circuit 34. The level of the synthesized voltage signal is equal to the sum of the levels of the voltage signals that were received by the coupler 18 at the same time.

The RF circuit 34 sends an analog level signal that indicates the level of the synthesized signal to the main controller 35 through the analog signal line 37. The RF circuit 34 demodulates the synthesized voltage signal to obtain a digital data signal. The RF circuit 34 sends the digital data signal to the main controller 35 through the digital signal line 38.

The main controller 35 recognizes the level of the synthesized signal, or the level of the received radio waves, based on the analog level signal. Also, the main controller 35 retrieves necessary data such as data regarding the condition of the corresponding tire from the digital data signal. The main controller 35 stores the obtained information into the memory 36 when necessary and displays the obtained information on a display device (not shown), which is located in the passenger compartment of the vehicle.

The reception operation of the receiver 9 will now be described.

Under normal conditions, the main controller 35 does not activate the control circuits 10–13. Therefore, the control circuits 10–13 do not attenuate received voltage signals. If one of the first to fourth transmitters 1–4 transmits radio waves, the radio waves are received by the first to fourth reception antennas 5–8. Each antenna 5–8 induces a voltage in accordance with the field intensity of the received radio waves. The first to fourth reception antennas 5–8 are located at different positions in relation with the transmitter 1–4 that transmitted the radio waves. Thus, the voltages induced by the first to fourth antennas 5–8 vary.

The four voltage signals from the antennas 5–8 are sent to the coupler 18 through the control circuits 10–13. Each control circuit 10–13 sends the corresponding voltage signal from the corresponding reception antenna 5–8 to the coupler 18 without attenuation. The coupler 18 synthesizes the received four voltage signals to form a single synthesized voltage signal and sends the synthesized voltage signal to the RF circuit 34. The RF circuit 34 retrieves an analog level signal and a digital data signal from the synthesized voltage signal and sends the signals to the main controller 35.

The main controller 35 receives signals at predetermined intervals (for example, every forty milliseconds). When receiving digital data, the main controller 35 judges whether the digital data is valid.

Specifically, the main controller 35 detects the pulse width of the received digital data. If the detected pulse width is within a predetermined range (for example 0.4 milliseconds to 1.0 milliseconds), the main controller 35 judges that the received signal is valid, or that the received signal was transmitted from one of the first to fourth transmitters 1–4, which are mounted on the vehicle. In this case, the main controller 35 continues the reception operation. After any one of the transmitters 1–4 starts transmitting, the main controller 35 determines that a valid signal is being received within forty milliseconds at the latest.

If the pulse width is not within the predetermined range, the main controller 35 judges that the received signal is not valid. In this case, the main controller 35 continues the reception operation for a predetermined period (for example, for three milliseconds) and then stops the operation.

When the received signal is valid, the main controller 35 performs a procedure for determining the source of the signal. First, the main controller 35 sends a control signal that represents an activation command to the first control circuit 10 through the control signal line 19. In response to the control signal, the first control circuit 10 attenuates the voltage signal from the first reception antenna 5.

At the same time the control signal is sent to the first control circuit 10, the main controller 35 detects the level of the synthesized voltage signal based on the analog level signal from the RF circuit 34. The main controller 35 stores data representing the detected level into the memory 36. Thereafter, the main controller 35 stops sending the control signal to the first control circuit 10, and the first control circuit 10 stops attenuating the voltage signal.

Subsequently, the main controller 35 sends a control signal that represents an activation command to the second control circuit 11 through the control signal line 20. In response to the control signal, the second control circuit 11 attenuates the voltage signal from the second reception antenna 6.

At the same time the control signal is sent to the second control circuit 11, the main controller 35 detects the level of the synthesized voltage signal based on the analog level signal from the RF circuit 34. The main controller 35 stores data that represents the detected level into the memory 36. Thereafter, the main controller 35 stops sending the control signal to the second control circuit 11, and the second control circuit 11 stops attenuating voltage signal.

Subsequently, the main controller 35 repeats the same procedure for the third and fourth control circuits 12 and 13. That is, the main controller 35 sends a control signal that represents an activation command to the third control circuit 12 through the control signal line 21 and stores data that represents the level of the synthesized voltage signal into the memory 36. Then, the main controller 35 sends a control signal that represents an activation command to the fourth control circuit 13 through the control signal line 22 and stores data that represents the level of the synthesized voltage signal into the memory 36.

Then, the main controller 35 compares the data stored in the memory 36 and determines which control circuit attenuated the signal when the data that indicates the lowest level was obtained. The main controller 35 judges that the reception antenna that corresponds to the identified control circuit is closest to the source transmitter. In other words, the main controller 35 determines the source transmitter based on the data that has the lowest level.

After the source transmitter is determined, the main controller 35 stops sending activation commands to the control circuits 10–13 so that the control circuits 10–13 stop attenuating input voltage signals. In this state, the main controller 35 detects the condition of the tire that corresponds to the source transmitter based on the digital data from the RF circuit 34.

Figure 3:
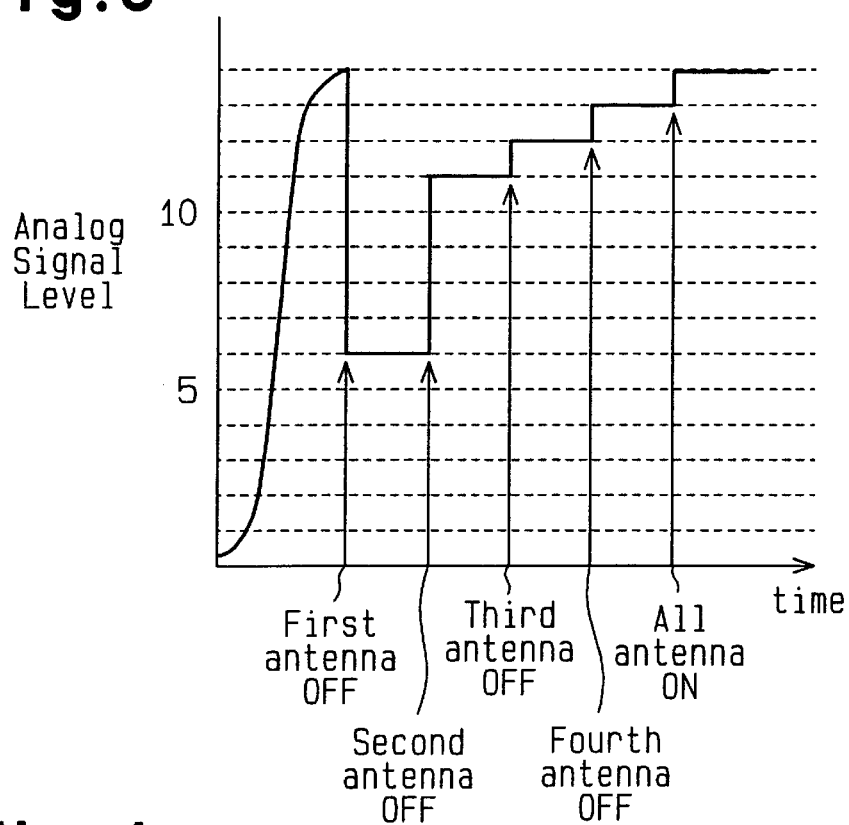
FIG. 3 is a timing chart showing the level of an analog signal received by the receiver of FIG. 1.

FIG. 3 is a timing chart showing the changes in an analog level signal that is outputted by the RF circuit 34 when the first transmitter 1 transmits radio waves. The level of the analog signal that is generated by the RF circuit 34 due only to voltage induced by the first reception antenna 5 is assumed to have a value of eight. Also, the level of an analog signal that is generated by the RF circuit 34 due only to voltage induced by the second reception antenna 6 is assumed to have a value of three. Further, the level of an analog signal that is generated by the RF circuit 34 due only to voltage induced by the third reception antenna 7 is assumed to have a value of two, and the level of an analog signal that is generated by the RF circuit 34 due only to voltage induced by the fourth reception antenna 8 is assumed to have a value of one. Assume that each control circuit 10–13 attenuates the associated input voltage signal to zero.

As shown in the timing chart of FIG. 3, the level of the analog level signal from the RF circuit 34 is six when the first reception antenna 5 is turned off, or when the first control circuit 10 performs attenuation. That is, when the voltage signals that are induced by the reception antennas 5–8 are received by the coupler 18 without being attenuated, the level of the analog signal that is generated by the RF circuit 34 is fourteen. However, since the voltage signal induced by the first reception antenna 5 is attenuated to zero by the first control circuit 10, the level of the analog level signal outputted by the RF circuit 34 is six, which represents only the voltage signals induced by the second to fourth reception antennas 6–8.

When the second reception antenna 6 is turned off, or when the second control circuit 11 performs attenuation, the level of the analog level signal outputted by the RF circuit 34 is eleven, which represents only the voltage signals induced by the first, third and fourth reception antennas 5, 7, 8.

When the third reception antenna 7 is turned off, or when the third control circuit 12 performs attenuation, the level of the analog level signal outputted by the RF circuit 34 is twelve, which represents only the voltage signals induced by the first, second and fourth reception antennas 5, 6, 8.

When the fourth reception antenna 8 is turned off, or when the fourth control circuit 13 performs attenuation, the level of the analog level signal outputted by the RF circuit 34 is thirteen, which represents only the voltage signals induced by the first to third reception antennas 5–7.

When the first control circuit 10 performs attenuation, the level of the analog level signal outputted by the RF circuit 34 is lowest. This indicates that the level of the voltage signal induced by the first reception antenna 5 is the highest. Thus, the first transmitter 1, which is closest to the first reception antenna 5, is judged to be the source of the current transmission.

Figure 4:
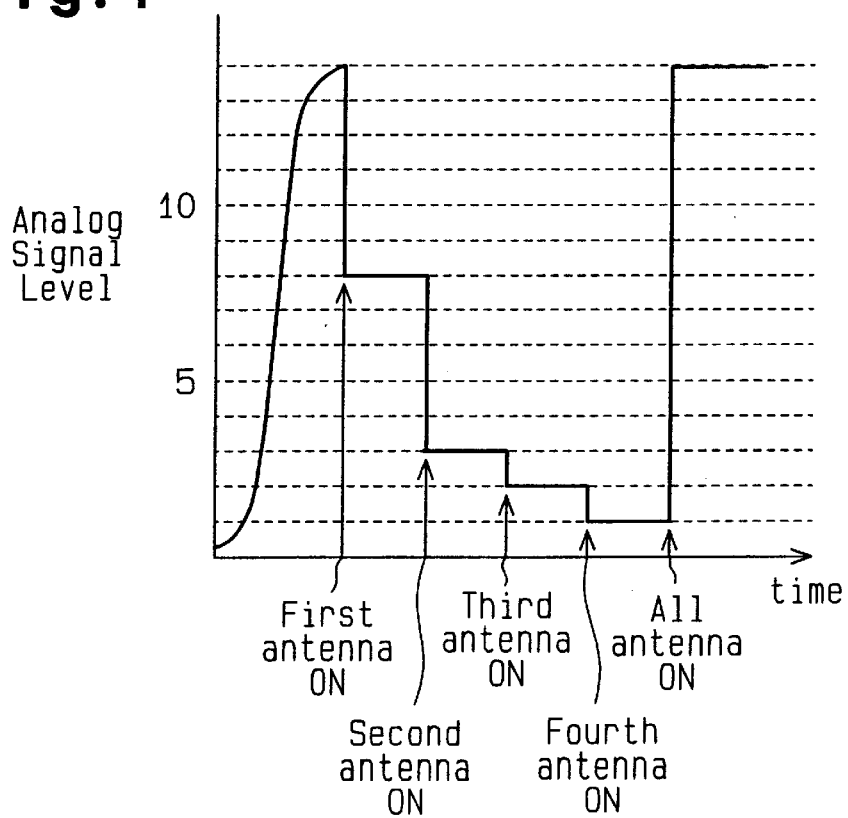
FIG. 4 is a timing chart showing the level of an analog signal received by a receiver of a comparison example.

Like FIG. 3, FIG. 4 is a timing chart showing the changes of an analog level signal outputted by the RF circuit 34 when the first transmitter 1 transmits radio waves. The timing chart of FIG. 4 represents the reception method disclosed in Japanese Unexamined Patent Publication 10-104103, which is described in the prior art section. Otherwise, the conditions are the same as those of FIG. 3.

In the method of the publication No. 10-104103, a number of antennas are switched by a multiplexer circuit such that only one of the antennas is valid at a time to determine the reception antenna that has the highest induced voltage level. The reception antenna that is valid when the voltage level is highest is determined to correspond to the source transmitter.

When determining which transmitter is transmitting and the corresponding reception antenna, the level of the analog level signal generated by the RF circuit 34 is generally higher in the method represented FIG. 3 than that of FIG. 4. For example, assume that the RF circuit 34 is only capable of receiving voltage signals having a level of five or higher. In the embodiment of FIG. 3, the RF circuit 34 can receive voltage signals during the entire procedure for determining the reception antenna and the transmitter. In the method of FIG. 4, the RF circuit 34 cannot receive voltage signals in certain periods. Therefore, in the method and apparatus of FIGS. 1 to 3, the receiver 9 is not required to be as sensitive as that used in the method represented by FIG. 4.

The control circuits 10–13 are activated only for attenuating an inputted voltage signal. That is, the control circuits 10–13 are only active during the procedure for determining the transmitting transmitter and the corresponding reception antenna. Otherwise, the control circuits 10–13 are not active and do not consume power, which reduces the power consumption.

Figure 5:
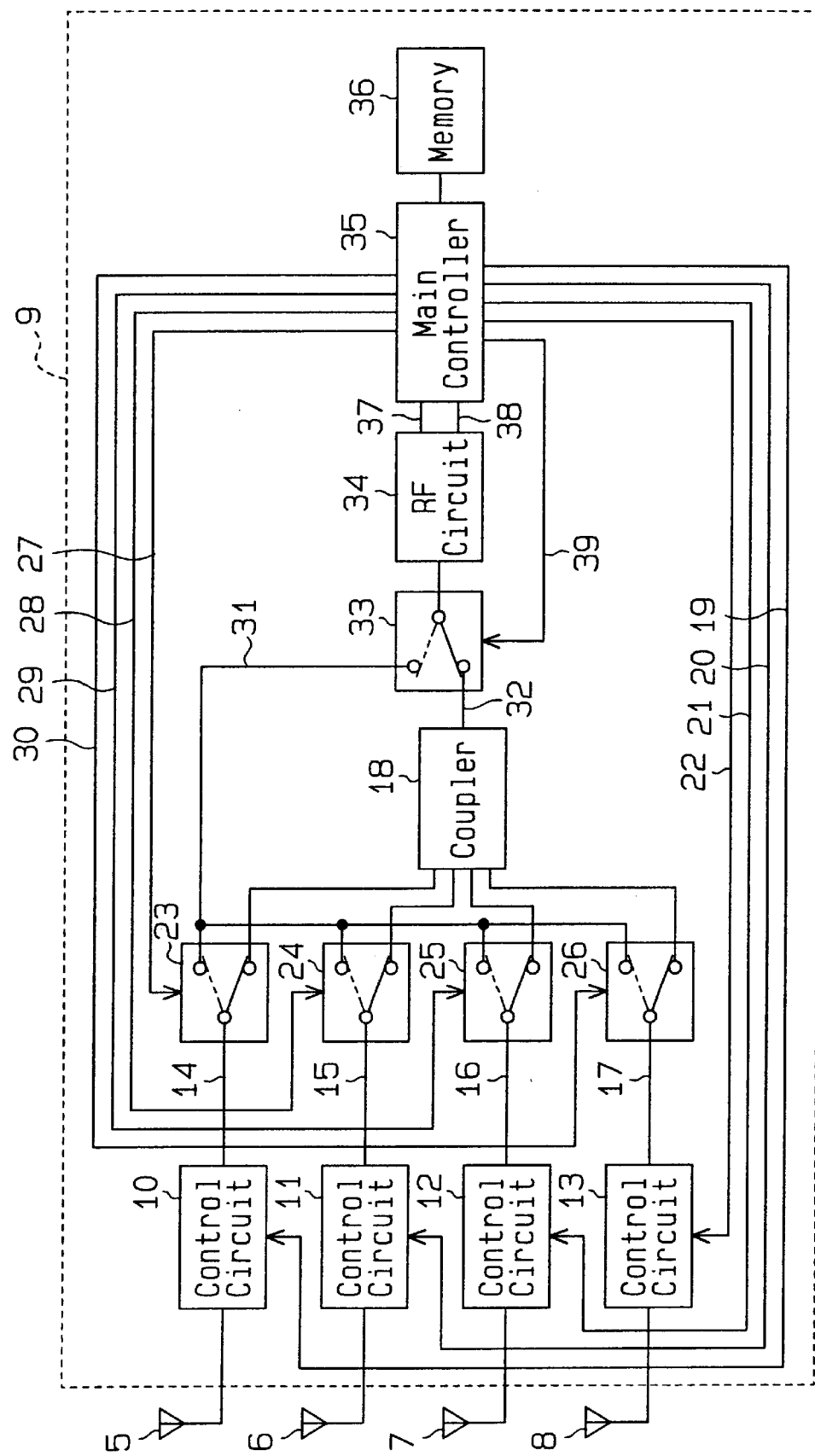
FIG. 5 is a block diagram illustrating a receiver according to a second embodiment of the present invention.

A second embodiment of the present invention will now be described with reference to FIG. 5. Mainly, the differences from the embodiment of FIGS. 1 to 3 will be discussed below. In the embodiment of FIG. 5, output changeover circuits 23, 24, 25 and 26 are located on the signal lines 14–17, which connect the control circuit 10–13 to the coupler 18, respectively. The output changeover circuits 23–26 are connected to the main controller 35 through control signal lines 27, 28, 29 and 30, respectively.

An input changeover circuit 33 is located on the signal line 32, which connects the coupler 18 with the RF circuit 34. The input changeover circuit 33 is connected to the output changeover circuits 23–26 by a signal line 31. The input changeover circuit 33 is connected to the main controller 35 by a control signal line 39.

As long as no activation signals are sent from the main controller 35, each output changeover circuit 23–26 connects the corresponding control circuit 10–13 to the signal line 31. Each output changeover circuit 23–26 is activated when it receives an activation command from the main controller 35. When activated, each output changeover circuit 23–26 connects the corresponding control circuit 10–13 to the coupler 18.

As long as no activation signals are sent from the main controller 35, the input changeover circuit 33 connects the signal line 31 to the RF circuit 34. The input changeover circuit 33 is activated when receiving an activation command from the main controller 35. When activated, the input changeover circuit 33 connects the coupler 18 with the RF circuit 34.

In the embodiment of FIG. 5, the active transmitter and the corresponding reception antenna are determined in the manner described with respect to the embodiment of FIGS. 1 to 3. The main controller 35 sends control signals that represent activation commands to the output changeover circuits 23–26 and the input changeover circuit 33 only when determining the transmitting transmitter and the corresponding reception antenna. Thus, as in the embodiment of FIGS. 1 to 3, the control circuits 10–13 are connected to the RF circuit 34 through the coupler 18.

When the active transmitter and the corresponding antenna are determined, the main controller 35 stops sending activation commands to the output changeover circuits 23–26 and the input changeover circuit 33. Thus, the control circuits 10–13 are directly connected to the RF circuit 34 without the coupler 18 in between. As a result, voltage signals, which are induced by the reception antennas 5–8, are directly sent to the RF circuit 34 without the coupler 18 in between.

Generally, the coupler 18 attenuates voltage signals by approximately three decibels. Specifically, when there are four antennas like the reception antennas 5–8 of the illustrated embodiment, the attenuation level of voltage signals is about six decibels, since four input voltage signals are synthesized in two steps as in a tournament chart. However, in the embodiment of FIG. 5, voltage signals induced by the reception antennas 5–8 are sent to the RF circuit 34 without passing through the coupler 18 after the active transmitter and the corresponding reception antenna are determined. Thus, the voltage signals are stronger. Therefore, information regarding the tire conditions is accurately obtained.

In this embodiment, the control circuits 10–13 attenuate input signals to zero. Unlike the embodiment of FIGS. 1 to 3, after identifying the active transmitter and the corresponding reception antenna, the main controller 35 stops sending activation commands only to the control circuit corresponding to the identified antenna, or the antenna that is closest to the source transmitter. The main controller 35 sends control signals that represent activation commands to the other three control circuits. If the identified reception antenna is the first reception antenna 5, only the first control circuit 10, which corresponds to the first reception antenna 5, stops receiving activation commands and stops attenuating input signals. The second to fourth control circuits 11–13 receive the control signals and attenuate input signals, which are sent from the corresponding reception antennas 6–8, to zero. Accordingly, only the voltage signal that is induced by the first reception antenna 5 and has the highest level is directly sent to the RF circuit 34 without the coupler 18 in between.

The procedure after the active transmitter and the corresponding reception antenna are identified may be modified as follows. That is, the main controller 35 stops sending activation commands to the control circuits 10–13 so that all the control circuits 10–13 do not attenuate received voltage signals. The main controller 35 stops sending activation commands to the input changeover circuit 33 to connect the signal line 31 with the RF circuit 34. Further, the main controller 35 stops sending activation commands only to the output changeover circuit that corresponds to the identified reception antenna and sends control signals representing activation commands to the rest of the output changeover circuits. For example, if the identified reception antenna is the first reception antenna 5, the output changeover circuit 23, which corresponds to the first reception antenna 5, connects the first control circuit 10 to the signal line 31 when the activation commands are stopped. The rest of the output changeover circuits 24–26 disconnect the corresponding control circuits 11–13 from the signal line 31 in response to control signals. Therefore, the highest voltage signal, which is induced in the first reception antenna 5, is sent to the RF circuit 34 without passing through the coupler 18.

When the reception of a signal is completed, the main controller 35 sends control signals that represent activation commands to the output changeover circuits 23–26 and the input changeover circuit 33. The activation signals may be sent to the output changeover circuit 23–26 and the output change over circuit 33 after the reception of a next signal is started.

A third embodiment according to the present invention will now be described in reference to FIGS. 1 to 3. The differences from the embodiment of FIGS. 1 to 3 will mainly be discussed below. FIGS. 1 and 3 are used in description of the third embodiment. Instead of the attenuation circuits, each of the control circuits 10–13 has an amplification circuit for amplifying a voltage signal sent from the corresponding reception antenna 5–8. Under normal conditions, that is, when the controller 35 does not send activation commands to the control circuits 10–13, the control circuits 10–13 amplify received voltage signals.

The amplifying function of each control circuit 10–13 is cancelled in response to an activation signal sent from the main controller 35. In this case, each control circuit 10–13 attenuates received voltage signals in response to an activation commands from the main controller 35 as in the embodiment of FIGS. 1–3. That is, in addition to the amplifying function, the control circuits 10–13 have attenuating function as in the embodiment shown in FIGS. 1–3.

Alternatively, instead of the amplification circuit, each of the controller circuits 10–13 may include an electric device that selectively connects and disconnects the corresponding reception antenna 5–8 with the signal line 14–17. When one of the control circuits 10–13 does not receive activation commands from the controller 35, the associated electric device connects the corresponding reception antenna 5–8 to the corresponding signal line 14–17. Therefore, a voltage signal that is received by the control circuit 10–13 is sent to the coupler 18 after being amplified by the amplifier. When one of the control circuits 10–13 receives an activation commands from the main controller 35, the associated electric device disconnects the corresponding reception antenna 5–8 from the signal line 14–17. Therefore, a voltage signal received by the control circuit 10–13 is not sent to the coupler 18. In other words, the level of the voltage signal received to the control circuit 10–13 is lowered to zero.

In this manner, the control circuits 10–13 of the third embodiment function as level changing means that raise and lower the levels of input voltage signals.

In the same manner as the embodiment of FIGS. 1–3, the transmitting transmitter and the corresponding reception antenna are determined. That is, the main controller 35 first sends a control signal representing an activation command only to the first control circuit 10 through the control line 19. In response to the control signal, the first control circuit 10 stops amplification and instead attenuates a voltage signal sent from the first reception antenna 5.

At the same time as sending the control signal to the first control circuit 10, the main controller 35 recognizes the level of a signal that is generated by synthesizing voltages induced in the second to fourth reception antennas 6–8. The main controller 35 stores data that represents the recognized levels in the memory 36. Since the amplification function of the second to fourth control circuits 11–13 is effective, the level of the synthesized voltage signal is relatively great. Thereafter, the main controller 35 stops sending control signal to the first control circuit 10 to activate the amplification function of the first control circuit 10. Then, the main controller 35 repeats the same procedure for the second to fourth control circuits 11–13.

Subsequently, the main controller 35 compares the data that are stored in the memory 36 and determines the amplification function of which control circuit was cancelled when the data that indicates the lowest level was obtained. The main controller 35 judges that the reception antenna that corresponds to the determined control circuit is closest to the source transmitter.

Thereafter, the main controller 35 stops sending activation commands to the control circuits 10–13 to activate the amplification function of all the control circuits 10–13. In this state, the main controller 35 detects the condition of the tire that corresponds to the source transmitter based on the digital data from the RF circuit 34.

The third embodiment has the same advantages as the embodiment of FIGS. 1–3. Particularly, since the control circuits 10–13 have the amplification function in the third embodiment, the levels of signals received by the RF circuit 34 are relatively high. Thus, compared to the first embodiment, reception data is more accurately analyzed. That is, the transmitting transmitter and the corresponding reception antenna are accurately determined, and the data concerning the tire conditions is accurately analyzed.

In the third embodiment, each control circuit 10–13 may only have the amplification function. That is, the control circuits 10–13 need not have the attenuation function. In this case, the amplification function of each control circuit 10–13 is cancelled in response to a control signal from the main controller 35, and the control circuit 10–13 outputs the input voltage signal without attenuating the signal.

The structure of the third embodiment may be applied to the embodiment of FIG. 5. That is, the control circuits 10–13 of the embodiment shown in FIG. 5 may have the amplification function described in the third embodiment.

It should be apparent to those skilled in the art that the present invention may be embodied in many other specific forms without departing from the spirit or scope of the invention. Particularly, it should be understood that the invention may be embodied in the following forms.

The attenuation circuits in the control circuits 10–13 may be cancellers, which cancel voltage signals from the antenna circuit 5–8. Also, voltage signals may be attenuated to zero. Alternatively, voltage signals may be attenuated by a predetermined amount. That is, the control circuits 10–13 may be modified as long as the circuits 10–13 are capable of changing input voltage signals.

Therefore, the present examples and embodiments are to be considered as illustrative and not restrictive and the invention is not to be limited to the details given herein, but may be modified within the scope and equivalence of the appended claims.

What is claimed is:

1. A tire condition monitoring apparatus for monitoring the conditions of a plurality of tires of a vehicle, comprising:

a plurality of transmitters, wherein each transmitter is located in one of the tires and transmits data that represents the condition of the corresponding tire by radio waves;

a plurality of reception antennas, which are located in the body of the vehicle, wherein each reception antenna corresponds to one of the transmitters and induces a voltage signal upon receiving radio waves from each transmitter;

a plurality of level changing means, wherein each level changing means corresponds to one of the reception antennas and lowers the level of an associated voltage signal that is induced by the corresponding reception antenna;

coupling means, wherein the coupling means synthesizes voltage signals from the level changing means to form a synthesized voltage signal; and control means for controlling the level changing means, wherein, when one of the transmitters has transmitted radio waves, the control means commands all the level changing means to consecutively execute level lowering procedure at intervals such that only one of the level changing means lowers the level of the associated voltage signal at a time, wherein the control means identifies the level changing means that lowered the level of the associated voltage signal when the level of the synthesized voltage signal was lowest, and wherein the control means determines that the reception antenna that corresponds to the identified level changing means corresponds to the transmitter that has transmitted radio waves.

2. The tire condition monitoring apparatus according to claim 1, wherein each level changing means includes a jamming circuit that generates a signal for jamming voltage signals.

3. The tire condition monitoring apparatus according to claim 1, wherein each level changing means includes an attenuator for attenuating voltage signals.

4. The tire condition monitoring apparatus according to claim 1, wherein each level changing means is activated to lower the level of the associated voltage signal in response to an activation command from the control means.

5. The tire condition monitoring apparatus according to claim 1, further comprising:
   an RF circuit, wherein the RF circuit outputs a level signal, which represents the level of the synthesized voltage signal, and a data signal, which represents the condition of one of the tires, in response to the synthesized voltage signal from the coupling means;
   a plurality of output switching means, wherein each output switching means is located between one of the level changing means and the coupling means;
   input switching means, wherein the input switching means is located between the coupling means and the RF circuit; and
   a signal line, which connects all the output switching means to the input switching means, wherein, when recognizing the tire condition based on a data signal from the RF circuit, the control means controls the output switching means and the input switching means such that the voltage signal is sent to the RF circuit from the identified level changing means without going through the coupling means.

6. The tire condition monitoring apparatus according to claim 1, wherein, when executing no level lowering procedure, each level changing means raises the level of the associated voltage signal.

7. A tire condition monitoring apparatus for monitoring the conditions of a plurality of tires of a vehicle, comprising:
   a plurality of transmitters, wherein each transmitter is located in one of the tires and transmits data that represents the condition of the corresponding tire by radio waves;
   a plurality of reception antennas, which are located in the body of the vehicle, wherein each reception antenna corresponds to one of the transmitters and induces a voltage signal upon receiving radio waves from each transmitter;
   a plurality of level control circuits, wherein each level control circuit corresponds to one of the reception antennas and lowers the level of an associated voltage signal that is induced by the corresponding reception antenna;
   a coupler, wherein the coupler synthesizes voltage signals from the level control circuits to form a synthesized voltage signal; and
   a controller for controlling the level control circuits, wherein, when one of the transmitters has transmitted radio waves, the controller commands all the level control circuits to consecutively execute level lowering procedure at intervals such that only one of the level control circuits lowers the level of the associated voltage signal at a time, wherein the controller identifies the level control circuit that lowered the level of the associated voltage signal when the level of the synthesized voltage signal was lowest, and wherein the controller determines that the reception antenna that corresponds to the identified level control circuit corresponds to the transmitter that has transmitted radio waves.

8. The tire condition monitoring apparatus according to claim 7, wherein each level control circuit includes a jamming circuit that generates a signal for jamming voltage signals.

9. The tire condition monitoring apparatus according to claim 7, wherein each level control circuit includes an attenuator for attenuating voltage signals.

10. The tire condition monitoring apparatus according to claim 7, further comprising:
   an RF circuit, wherein the RF circuit outputs a level signal, which represents the level of the synthesized voltage signal, and a data signal, which represents the condition of one of the tires, in response to the synthesized voltage signal from the coupler;
   a plurality of output switch circuits, wherein each output switch circuit is located between one of the level control circuit and the coupler;
   an input switch circuit, wherein the input switch circuit is located between the coupler and the RF circuit; and
   a signal line, which connects all the output switch circuit to the input switch circuit, wherein, when recognizing the tire condition based on a data signal from the RF circuit, the controller controls the output switch circuits and the input switch circuit such that the voltage signal is sent to the RF circuit from the identified level control circuits without going through the coupler.

11. The tire condition monitoring apparatus according to claim 7, wherein, when executing no level lowering procedure, each level control circuit raises the level of the associated voltage signal.

12. A tire condition monitoring apparatus for monitoring the conditions of a plurality of tires of a vehicle, comprising:
   a plurality of transmitters, wherein each transmitter is located in one of the tires and transmits data that represents the condition of the corresponding tire by radio waves;
   a plurality of reception antennas, which are located in the body of the vehicle, wherein each reception antenna corresponds to one of the transmitters and induces a voltage signal upon receiving radio waves from each transmitter;
   a plurality of amplifiers, wherein each amplifier corresponds to one of the reception antennas and amplifies an associated voltage signal that is induced by the corresponding reception antenna;
   a coupler, wherein the coupler synthesizes voltage signals from the amplifiers to form a synthesized voltage signal; and
   a controller for controlling the amplifiers, wherein, when one of the transmitters has transmitted radio waves, the controller commands all the amplifiers to consecutively stop amplifying at intervals such that only one of the amplifiers stops amplifying at a time, wherein the controller identifies the amplifier that stopped amplifying when the level of the synthesized voltage signal was lowest, and wherein the controller determines that the reception antenna that corresponds to the identified amplifier corresponds to the transmitter that has transmitted radio waves.

13. A method for monitoring the conditions of a plurality of tires of a vehicle, comprising:

transmitting data representing the condition of each tire by radio waves from transmitters, each of which is located in one of the tires;

inducing a voltage signal upon receiving radio waves from each transmitter in a plurality of reception antennas, each of which corresponds to one of the transmitters;

forming a synthesized voltage signal by synthesizing the voltage signals from the reception antennas;

consecutively lowering the levels of the voltage signals induced by all the reception antennas such that only one of the voltage signals is lowered at a time when one of the transmitter transmits a radio wave; and determining that an active one of the transmitters is one that is associated with one of the antennas that corresponds to the voltage signal being lowered when the lowest level of the synthesized voltage signal occurs while the voltage signals are being lowered.

14. The method according to claim 13, wherein the level of each voltage signal is lowered by a signal for jamming voltage signals.

* * * * *